United States Patent Office 2,723,827
Patented Nov. 15, 1955

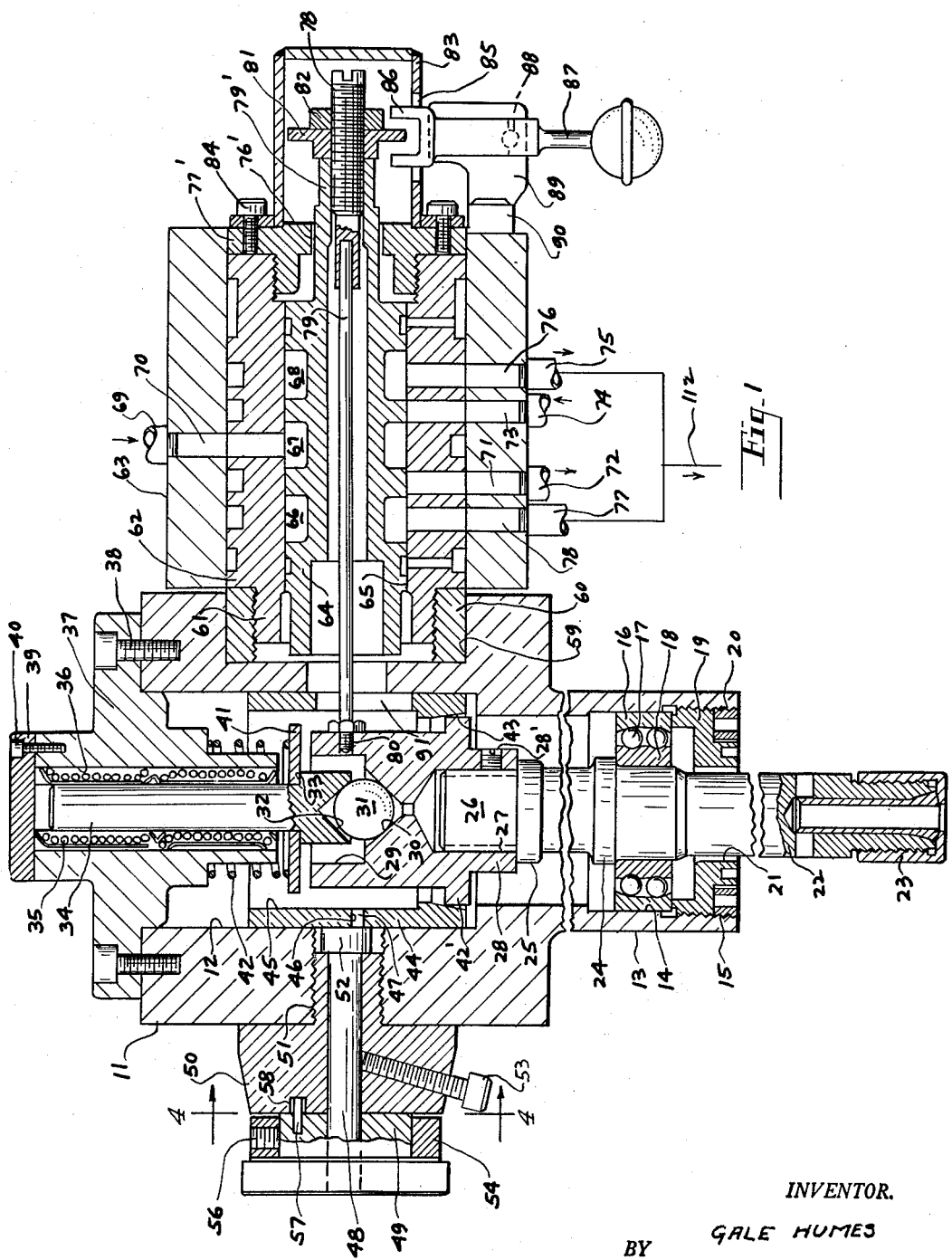

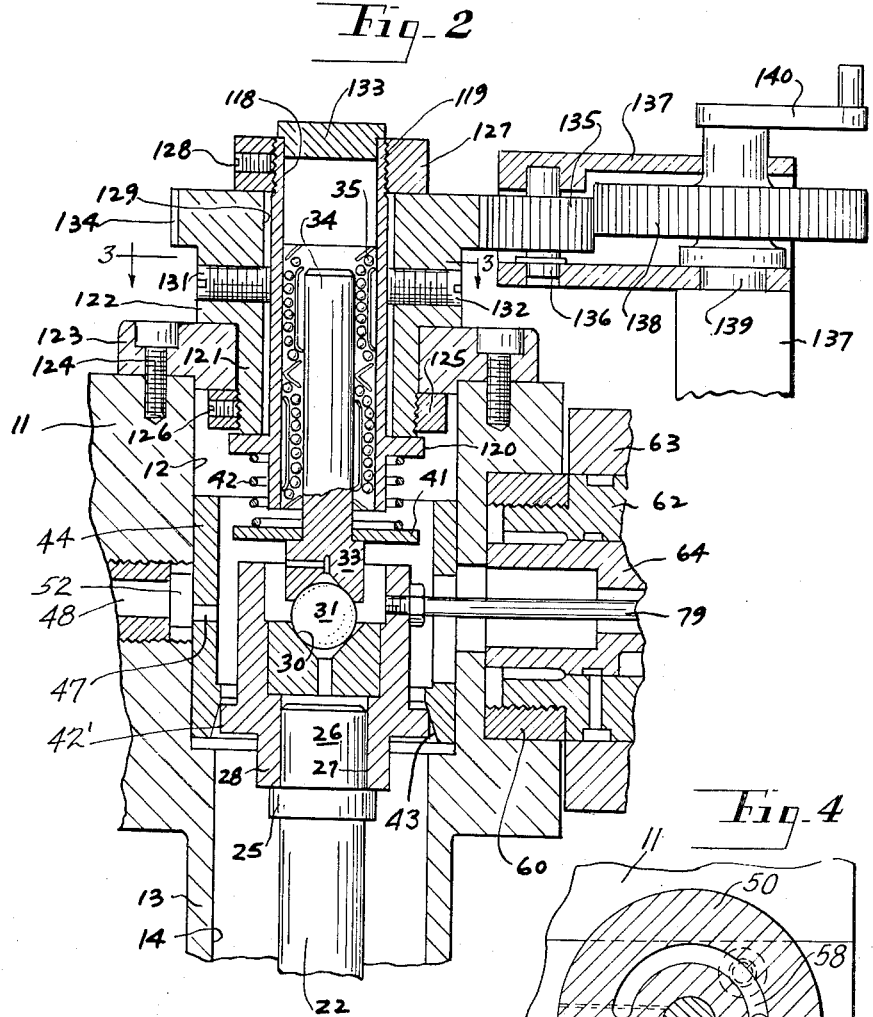
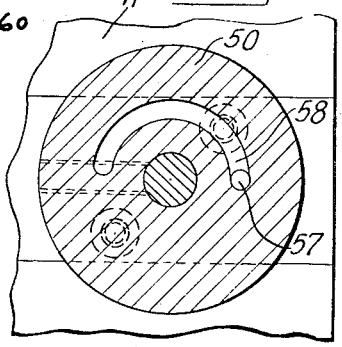
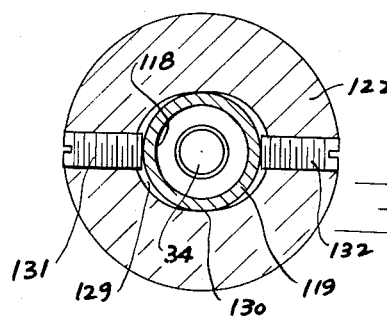

2,723,827
TWO DIMENSION PENCIL TRACER

Gale Humes, Birmingham, Mich., assignor to Manuel Turchan, doing business as Turchan Follower Machine Company, Detroit, Mich.

Application June 3, 1954, Serial No. 434,236

5 Claims. (Cl. 251—3)

This invention relates to machine tools, and more particularly to a tracer controlled contouring mechanism.

It is the object of the present invention to provide a novel tracer construction, which tracer is adapted to control the simultaneous operation of a pair of right angularly arranged slide controlling cylinders on a contouring device.

It is the object of the present invention to provide a novel dial feed control for the tracer mechanism for regulating velocity of feed movements of the respective slides controlled by the tracer mechanism.

It is the further object of the present invention to provide a manually controlled element forming a part of the tracer for regulating the eccentricity of the upper portion of the tracer spindle in conjunction with the control of said spindle upon a pair of right angularly arranged fluid control valves.

It is the still further object of the present invention to provide control mechanism for rotating said eccentric control.

These and other objects will be seen from the following specification and claims in conjunction with the appended drawings, in which:

Fig. 1 is a fragmentary elevational section of the present tracer mechanism illustrating the dial feed control for regulating feed movements.

Fig. 2 is a fragmentary elevational section of the tracer shown in Fig. 1 but with an eccentric control incorporated into the tracer mechanism.

Fig. 3 is a fragmentary section taken on line 3—3 of Fig. 2 and,

Fig. 4 is a section taken on line 4—4 of Fig. 1.

It will be understood that the above drawings illustrate merely a preferred embodiment of the invention, and that other embodiments are contemplated within the scope of the claims hereafter set forth.

Referring to the drawings, the present tracer mechanism is illustrated in section in Fig. 1, and while it has an elongated spindle 22, it has been foreshortened in the drawing.

The present tracer mechanism is the two dimensional universal type tracer which includes block 11 and cylindrical bore 12 and the depending shank 13 with bore 14, the lower end of said shank being internally threaded at 15. Within the bore 14 of said shank there is positioned bearing support 16 with bearing 17 and therein the centrally apertured bearing race 18, said bearing being supported by the adjusting screw 19 threaded into the lower end of shank 13 and secured in adjusted position by lock nut 20.

Adjusting screw 19 is centrally apertured at 21 to loosely receive the manually operable elongated depending spindle 22 having tracer tip 23 at its lower end.

Said spindle is projected down through bearing race 18 and shoulder 24 on said spindle is supportably engaged by said bearing race to thereby provide a universal mounting of said spindle so that the same in manually responding to the surface of a template is adapted for tilting movements in any direction throughout an arc of 360 degrees.

Further upon the spindle 22, which is broken away as shown, there is provided another shoulder 25, and above said shoulder the free end of the spindle 26 is threaded to threadedly engage the bore 27 of the valve actuator 28, there being a suitable set screw 28' for securing said actuator in position.

Said actuator, adapted to control the longitudinal and reciprocal movements of a pair of right angularly related fluid control valves in the manner hereafter described, has a bore 29 at its upper end terminating in the axial conical recess 30 which receives the ball 31.

The ball is projected up into a corresponding conical recess 32 formed in the enlarged head 33 upon the lower end of pin 34, said pin slidably projecting up into the ball bushing 35 secured within the bore 36 of tracer body cap 37.

Cap 37 is positioned over the top of block 11, is secured thereto by the screws 38, and as shown in Fig. 1, depends down into bore 12 of the tracer body in order to properly support and form a guide for the hold-down pin 34.

Disc 41 is centrally mounted upon pin 34 and bears against the enlarged head 33 thereof and receives the lower end of coiled spring 42, the upper end of said spring surrounding a reduced diameter portion of said cap and bearing against a shoulder formed thereon whereby said spring normally urges said pin against the ball 31, which resilient force is transmitted to spindle 22 for normally maintaining the same in the axial upright positioning shown in Fig. 1.

The lower end of the valve actuator 28 has an annular flange 42' of increased diameter, which is cooperatively positioned within the conically shaped upwardly converging axial opening 43 formed within the lower end of vertically adjustable sleeve 44. Said sleeve has a cylindrical bore 45 which is positioned around valve actuator 28 and loosely around portions of spring 42 and disc 41, and has a transverse elongated slot 46 within which is positioned the eccentric pin 47 on the enlarged shoulder 52 upon the inner end of shaft 48. Handle 49 is secured to said shaft and is in registry with hub 50, which has a portion of reduced diameter 51 threaded partially into the side of block 11, there being sufficient clearance to permit positioning of head 52 inwardly of shank 51.

By manually rotating handle 49 which forms a part of the dial feed control for the tracer, the eccentric positioning of pin 47 within the transverse slot 46 will cause vertical adjustments of sleeve 44 to thereby regulate the amount of clearance between its lower conical portion 43 and shoulder 42' of the valve actuator.

Consequently, the dial feed control mechanism provides a means for limiting the amount of tilting movement of the spindle as its tracer tip is manually traversed over the edge of a template for illustration. This in turn regulates the amount of responsive displacement of the fluid control valves to thereby regulate the velocity of feed movements of slide operating cylinders adapted for connection thereto.

Set screw 53 within hub 50 is adapted to operatively engage shaft 48 for retaining said shaft in any desired or selected position of adjustment.

The ring 54, mounted upon the reduced portion of handle 49, is adjustably secured thereto as by the set screw 56, and has upon its exterior surface a series of calibrations or indicia 55 whereby handle 49 may be rotatably adjusted to a predetermined position.

As it is desired to limit rotary movements of shaft 48 forming a part of the dial feed control to 180 degrees, there is provided as shown in Figs. 1 and 4, a pin 57 which is secured to and projects inwardly from handle 57 and cooperatively registered within the semi-circularly shaped slot 58 formed within hub 50.

There is a pair of conventionally arranged right angularly related valve bodies whose axes lie in a horizontal plane in the preferred embodiment of the invention, but might more generally be described as lying in a plane at right angles to the longitudinal axis of the spindle. One of such valve bodies 63 is described in detail in conjunction with Fig. 1, the other thereof being of an identical construction and containing a valve sleeve and a reciprocal valve functioning in exactly the same manner as the valve now to be described in conjunction with Fig. 1 within valve body 63, and consequently the second valve body will not be described in detail.

Upon one side of block 11 there is provided a circular recess 59 within which is positioned and secured the internally threaded ring 60 adapted to threadedly receive the reduced threaded extension 61 of valve sleeve 62 over which is secured valve body 63. Said sleeve has an internal bore 65 adapted to slidably receive valve 64 which has in its exterior surface a series of longitudinally spaced annular openings 66, 67 and 68.

Fluid conduit 69 adapted for delivering pressure fluid from a suitable hydraulic unit is joined to valve body 63 in communication with passage 70 which extends through said valve body and through sleeve 62 joining valve opening 67. In the position of the valve shown in Fig. 1 all fluid flow is blocked. However, upon movement to the left of said valve, pressure fluid will flow into cylinder passage 71 which extends through the sleeve and through the block and communicates with cylinder conduit 72 adapted for connection to a hydraulic cylinder on one side of its piston. Exhaust flow from the opposite side of the piston in said cylinder returns through conduit 74 and communicates with passage 73 which extends through said block and sleeve and communicates with valve opening 68. Through said opening the fluid flows through exhaust passage 76 which extends through said sleeve and block joining exhaust pipe 75 and exhaust conduit 112 returning to hydraulic unit 111. Should the valve 64 be moved to the right of the neutral position shown in Fig. 1, pressure fluid in valve opening 67 would flow through passage 73 and conduit 74 to the opposite end of such cylinder. Exhaust fluid from the opposite side of said piston returns through conduit 72 joining said valve block and passage 71 entering valve opening 66. Exhaust flows therefrom through passage 78 and conduits 77 and 112 back to a suitable fluid storage sump.

Mounted upon a suitable support is the tracer body 11 from which depends spindle 22, whose contactor 23 of Fig. 1 is adapted to engage the profile of a template. As said spindle is manually applied to the profile of said template any variation in the surface thereof will produce lateral tilting movements of said spindle about its supporting bearings 17. There will be a corresponding movement of the valve operator 28 upon the upper end of said spindle. This valve operator in turn will control the longitudinal positioning of the two fluid control valves which are arranged at right angles to each other within the right angularly related valve bodies 63, one of such valves being described in conjunction with Fig. 1.

Valve 64 has a longitudinal bore throughout its length and terminates at its outer end in the shank 79' which is interiorly threaded and threadedly receives therein the threaded end 78' of the elongated tie bar 79, which extends loosely through the bore of said valve and is secured at its inner end at 80 to valve operator 28. Adjusting disc 81 is threaded upon the outer end portion 78' of said tie rod and secured in position by lock nut 82.

Closure cap 77' is positioned within the outer end of valve body 63 and has a reduced threaded portion extending into the outer end of sleeve 62, said cap being centrally apertured at 76' to loosely receive the shank 79' of valve 64. There is provided a protective cap 83 which is loosely positioned over the outer end of tie rod 79—78' and is secured to cap 77' by the screws 84. Said cap having a transverse slot 85 as shown in Fig. 1.

Bracket 89 is mounted upon the outer end of body 63, secured thereto by the bolt 90 and has pivotally mounted at its outer end at 88 a manual control 87 whose inner bifurcated end 86 extends loosely through slot 85 and loosely receives a portion of disc 81. Thus manual pivotal movement of control 87 will effect longitudinal adjustments of valve 64. It will be noted in Fig. 1 that sleeve 44 is laterally slotted at 91 to provide clearance for tie rod 79, there being a second right angularly related slot 91 not shown but formed in said sleeve to loosely receive the corresponding tie rod for the other valve.

The second valve body has a valve sleeve and valve of exactly the same structure as valve sleeve 62 and valve 64 and operates in exactly the same manner and is adapted for controlling the flow of pressure fluid from a hydraulic unit to a cross feed cylinder, for illustration.

The hydraulic unit employed contains a suitable fluid storage sump and a power operated pump for supplying pressure fluid in a conventional manner. Such hydraulic unit delivers this pressure fluid through conduit 69, and depending upon the positioning of the valve within valve body 63 delivers this fluid to one or the other of cylinder conduits 72 and 74. Exhaust from the other cylinder conduit returns through conduit 112 back to the storage sump within said hydraulic unit.

The flow of pressure fluid depending upon the movements of the corresponding control valve, is regulated by such movement of valve operator 28 as effects longitudinal movements of the corresponding tie bar interconnecting said valve operator and a control valve.

In Fig. 4 there is shown a variation of Fig. 1, being directed to the same type of tracer but including an additional mechanism for eccentrically positioning the valve operator 28, and for adjusting the eccentricity thereof.

The tracer shown in Fig. 4, fragmentarily, in place of the cap 37 of Fig. 1 for supporting ball bushing 35, has an elongated sleeve 119 with an internal bore 118 within which is positioned ball bushing 35 and which slidably receives the pin 34 in the same manner as in Fig. 1.

Towards the lower end of sleeve 119, there is an annular exterior flange 120. Coiled spring 42 the same as in Figs. 1, is interposed between disc 41 joined to pin 34, and said flange normally urging said pin axially towards ball 31 and normally maintaining the tracer spindle in the axial position shown.

Sleeve 119 is loosely positioned within the elliptically shaped bore 129 formed within the upright concentric sleeve 122. Said sleeve is rotatably positioned upon valve cover 123 secured to valve body 11 by screws 124, and has a reduced shank 121 which extends through said cover and upon its lower threaded end receives the lock washer 125 with its set screw 126, to thereby retain said sleeve upon said cover.

Upon the upper end of sleeve 119 there is threadedly positioned a second lock washer 127 with set screw 128 for further securing said sleeve upon rotatable element 122.

As shown in Fig. 3 the bore 129 is elongated but is of a width to slidably receive tubular element 119. Oppositely arranged transverse screws 131 and 132 threadedly extend through the side walls of rotatable element 122 and at their inner ends are adapted to adjustably and operatively engage sleeve 119 to thereby fix the positioning of said sleeve within recess 129. Tightening of one screw and loosening the other will thereby effect an eccentric positioning of sleeve 119 with respect to the spindle axis and will thereby achieve a corresponding eccentricity of the valve operator 28. This eccentricity can be regulated by the said screws 131 and 132. In view of the shape of the bore 129, sleeve 119 slidably engages the opposed interior bounding walls thereof as at 130, so that the eccentricity of said sleeve may be easily adjusted. Sleeve 119 has a closure cap 133 at its upper end. Rotatable element 122 has an annular gear formation 134 at its upper end, which is in mesh with pinion 135 journaled at 136 within gear housing 137. Said pinion is in mesh with rotatable gear 138 journaled at 139 within said gear housing and having a handle 140 joined thereto providing one means for rotating a gear 138 and in turn rotating element 122 to thereby change the eccentric relationship of the valve operator 28 with respect to the right angularly related fluid control valves 64 which regulate the flow of pressure fluid.

The provision of the present control for regulating the eccentricity of the valve operator through sleeve 119, pin 34 and ball 31 accomplishes the same result as would be accomplished if said valve operator were a cam and had a varied control effect upon each of the respective valves depending upon its rotated position.

Such a control for a universal two dimensional tracer of this type is shown in the copending patent application of Gale Humes, Serial Number 365,809 filed July 3, 1953.

Having described my invention, reference should now be had to the claims which follow for determining the scope thereof.

I claim:

1. A tracer comprising a hollow housing, a pair of right angularly related valve bodies joined thereto, a spindle mounted intermediate its ends within the lower end of said housing for universal tilting movements and with one end adapted for manual traverse over the profile of a template, a reciprocal fluid control valve in each body movable at right angles to each other and in a plane at right angles to the spindle axis, a valve actuator axially mounted upon the other end of said spindle, a pair of right angularly arranged tie rods co-axial of said valves joined at their inner ends to said actuator and at their outer ends to each valve respectively, whereby universal tilting movements of said spindle will effect longitudinal movements of said valves, a spindle centering hold-down pin slidably mounted in said housing axially aligned with said actuator with its lower end loosely and restrainingly connected with a central portion of said actuator, guide means receiving said pin mounted on said housing and laterally adjustable for effecting an initial eccentric displacement of said valve actuator through said pin, and a coiled spring interposed between said guide means and pin.

2. The tracer of claim 1, said guide means including an elongated sleeve slidably receiving said pin, an annular flange on said sleeve, said spring surrounding said sleeve and interposed between said flange and pin.

3. The tracer of claim 1, said guide means including an elongated sleeve slidably receiving said pin, an elongated support for said sleeve axially mounted on said housing and having an upright laterally elongated slot, the opposed sides of which guidably receive said sleeve, and a pair of transverse opposed set screws threaded through said support on opposite sides thereof and engageable at their inner ends with said sleeve for effecting lateral adjustments of said sleeve within said support.

4. The tracer of claim 1, said guide means including an elongated sleeve slidably receiving said pin, an elongated support for said sleeve axially mounted on said housing and having an upright laterally elongated slot, the opposed sides of which guidably receive said sleeve, and a pair of transverse opposed set screws threaded through said support on opposite sides thereof and engageable at their inner ends with opposite sides of said sleeve for effecting lateral adjustments of said sleeve within said support, and means for rotating said support and sleeve for changing the eccentric relation of said valve actuator with respect to said valves.

5. The tracer of claim 1, said guide means including an elongated sleeve slidably receiving said pin, an elongated support for said sleeve axially mounted on said housing and having an upright laterally elongated slot, the opposed sides of which guidably receive said sleeve, a pair of transverse opposed set screws threaded through said support on opposite sides thereof and engageable at their inner ends with said sleeve for effecting lateral adjustments of said sleeve within said support, a circular gear on the exterior of said support, and rotative gear means meshing with said circular gear for changing the eccentric relation of said valve actuator with respect to said valves.

References Cited in the file of this patent

UNITED STATES PATENTS

| | | |
|---|---|---|
| 2,332,532 | Roehm-A | Oct. 26, 1943 |
| 2,332,533 | Roehm-B | Oct. 26, 1943 |
| 2,562,284 | Tancred | July 31, 1951 |
| 2,620,823 | Adams | Dec. 9, 1952 |